United States Patent [19]

Davies

[11] 4,157,861
[45] Jun. 12, 1979

[54] OPTICAL BEAM STEERING SYSTEM

[75] Inventor: Kirk E. Davies, La Mesa, Calif.

[73] Assignee: The United States of America as represented by the Secretary of the Navy, Washington, D.C.

[21] Appl. No.: 821,269

[22] Filed: Aug. 3, 1977

[51] Int. Cl.² ............................................. G05D 25/00
[52] U.S. Cl. ..................................................... 350/285
[58] Field of Search ............... 350/285, 289, 169, 274, 350/6.91, 16, 294, 61, 288, 138; 356/250, 138; 331/94.5 D; 248/330, 289 R, 289 A, 483, 491

[56] References Cited
U.S. PATENT DOCUMENTS

| | | | |
|---|---|---|---|
| 2,587,219 | 2/1952 | Rettinger | 350/285 |
| 3,753,150 | 8/1973 | Zar | 350/285 |
| 3,799,644 | 3/1974 | Street | 350/285 |
| 3,856,382 | 12/1974 | Midlaud | 350/6.6 |
| 4,060,314 | 11/1977 | Heinz | 350/285 |
| 4,073,567 | 2/1978 | Lakerveld et al. | 350/285 |

Primary Examiner—John K. Corbin
Assistant Examiner—B. W. de los Reyes

Attorney, Agent, or Firm—R. S. Sciascia; G. J. Rubens; J. W. McLaren

[57] ABSTRACT

An optical beam steering system is provided by a reflective surface mounted on a baseplate which is electromagnetically driven by applied signals to control its angular disposition to a degree of accuracy within fractions of a microradian. Resilient means such as coil springs are attached in pairs to the baseplate to define two orthogonally related axes of movement intersecting at the geometric center of the baseplate. A pivotal support (preferably a jewel bearing) is positioned at the geometric center of the baseplate; first and second pairs of permanent magnets extend from the baseplate at opposite equidistant points from the pivotal support to define first and second axes of movement which are also orthogonally related. Associated pairs of electrically conductive coils are disposed around the permanent magnets and spaced therefrom to permit relative movement and a selectively variable electrical signal source is connected to the coils, preferably in push-pull arrangement, to generate electromotive forces which are transmitted to the baseplate for angularly positioning the baseplate and reflective surface about the first and second axes of movement.

7 Claims, 3 Drawing Figures

OPTICAL BEAM STEERING SYSTEM

BACKGROUND OF THE INVENTION

In advanced optical systems presently used and under development it is frequently required that an optical beam such as a laser beam, for example, be accurately and very precisely directed in angular disposition with respect to a relatively small distant target. Since the size of the beam is customarily very small, extremely high accuracy in directing or steering the beam is required to prevent the loss or attenuation of light energy transmitted by the beam which would thereby detract from the effectiveness and efficiency of the optical system in which it is used.

A closely analogous problem is tracking a light energy source, since in both cases a reflective element must frequently be angularly positioned with an accuracy of fractions of a microradian.

In the present state of the art there are three principal methods and techniques which are employed for accomplishing high precision beam steering and tracking. One such prior art method involves the employment of two orthogonally oriented galvanometers which are energized to control the movement of a reflective surface relative to two orthogonally related axes of movement.

One major problem with the galvanometer type of system and technique is the requirement for having to locate two galvanometer driven reflective members which is frequently inconvenient by reason of space considerations. Moreover, the distance between the two galvanometer units often presents a problem due to beam divergence and different distances to the target. Additionally, the galvanometer technique and method of beam steering inherently involves a problem of hysteresis, i.e., the reflective surface does not completely return to its precise initial position after having undergone actuation in response to energization of the galvanometer movements. Since there are two galvanometer movements involved, each of which positions a reflective surface relative to a different orthogonally related axes of movement, such hysteresis problems can be compounded and thereby lead to serious difficulty.

Another method which employs two orthogonally oriented servo driven mirrors also requires two separate reflective units and therefore necessarily similarly involves the problem of space considerations and the location of the two separate units with respect to each other; undesirably the distance between the units can give rise to unwanted beam divergence and also different distances to the target. Furthermore, servomechanism drives are generally relatively large and bulky, particularly where precision beam steering involves a highly precise optical beam such as a laser beam, for example, and the driven reflective surface may be of the order of only several centimeters in diameter.

A third technique employs the use of flexure responsive piezo-electric elements as motor transducers; i.e., they convert on electrical input to a mechanical output so as to change the angular disposition of a baseplate to which they're attached. These devices, which are known under the trademark BIMORPH, are essentially laminates of piezoelectric ceramic material in a disk form supporting the reflective surface. Two sets of electrodes orthogonally oriented on the disk are connected to a suitable source of electrical control signals. Upon energization by the control signals, the piezoelectric material is caused to bend (somewhat in the manner of a bimetallic spring upon the application of heat) thus angularly changing the disposition of the baseplate to which they are attached and the reflective surface supported thereon.

One deficiency of the piezoelectric disk technique, however, is that only relatively extremely small deflection angles are obtainable within the limits of the extreme deflection realized upon the application of appropriate electrical control signals. Additionally, relatively high voltages are required to actuate the piezoelectric types of devices which, though not a prime consideration, may be a disadvantage in certain types of systems.

The major problem, however, with the piezoelectric laminate technique is that an extremely high degree of hysteresis is encountered in their use so that a corrective signal input is often required to overcome the amount of hysteresis which prevents the reflective surface from being returned to precisely its original starting angular position.

These prior art devices, though operationally feasible, present numerous disadvantages which, if obviated, could significantly improve beam steering systems which angularly position a reflective surface so as to point a laser beam or track a light energy source, for example.

Accordingly, it is highly desirable that a beam steering system be devised which eliminates many, if not all, of the disadvantages of the known prior art systems and techniques used to point a laser beam or track a light energy source.

SUMMARY OF THE INVENTION

The present invention contemplates a beam steering system which employs electromotive force generated by an electromagnetic arrangement to position a reflective surface against a resilient or spring force which permits the reflective surface to return to its original angular disposition with little or no hysteresis. Such high accuracy, angular control of the reflective surface is required because frequently in beam steering and tracking systems the reflective surface must be positioned within a fraction of a microradian. Manifestly, therefore, an extremely high degree of accuracy is required in both the actuated positioning of the reflective surface and also of its return to its precise original angular disposition without hysteresis.

The present invention consists of a baseplate which supports a reflective surface positioned to receive and reflect an optical beam, whether it be for the purpose of beam steering or tracking a light energy source. A first pair of resilient means such as coil springs, for example, are attached to support the baseplate at opposite points on a first axis and also equidistant from the geometric center of the baseplate which is preferably circular in configuration. A second pair of resilient means are attached to support the baseplate at opposite points equidistant from the geometric center of the baseplate, defining a second support axis which is orthogonally related to the first support axis.

A pivotal support (preferably a jewel bearing) is positioned at the geometric center of the baseplate which is the intersection of the two orthogonally related support axes.

A first pair of permanent magnets extend from the baseplate at opposite points equidistant from the pivotal support to define a first axis of movement preferably disposed at 45° relative to the two support axes. A second pair of permanent magnets extend from the baseplate at opposite points equidistant from the pivotal support and define the second axis of movement which is at right angles to the first axis of movement.

An electrically conductive coil is disposed around each of the permanent magnets and spaced therefrom to permit relative movement between the respectively associated coils and magnets.

A selectively variable electrical source is arranged and disposed to be connectable to the coils for generating electromotive force by reason of the conduction of current through the coils, and the flux linkage between the magnetic flux thus generated and the magnetic field of the respectively associated permanent magnet attached to the baseplate.

In this manner electromotive forces are developed which are transmitted to the baseplate causing mechanical movement about the pivotal support and the first and second axes of movement to angularly position the baseplate and the reflective surface supported thereon as desired in response to the applied electrical signals.

In a preferred embodiment of the present invention the electrical control signals are employed to drive push-pull amplifiers each of which is connected to a pair of oppositely disposed coils so as to provide push-pull actuation of the centrally pivoted baseplate and reflective surface supported thereon about each axis of movement. When the applied electrical control signals are removed the resilient means in the form of coil springs, for example, immediately return the attached baseplate and the reflective surface to the initial angular disposition with little or virtually no hysteresis thus providing extremely high accuracy in pointing or steering an optical beam or tracking a source of light energy.

As may be readily appreciated by those knowledgeable and skilled in the pertinent arts, the applied control signals which are employed to actuate the beam steering or tracking system of the present invention may be provided by an error signal derived as a measure of the deviation of the instantaneous angular position of the reflective surface from a desired angular disposition.

Accordingly, it is a primary object of the present invention to provide an optical beam steering or tracking system which is capable of extremely high accuracy of the order of fractions of a microradian in controlled angular disposition.

Another most important object of the present invention is to provide an optical beam steering or tracking system which is angularly positionable about two axes of movement without the requirement for two separate reflective surfaces.

A further important object of the present invention is to provide an optical beam steering or tracking system which is embodied in a small, compactly fabricated assembly, requiring minimal space.

Yet another most important object of the present invention is to provide an optical beam steering or tracking system which obviates the hysteresis problems of comparably operative prior art systems.

An ancillary object of the present invention is to provide an optical beam steering or tracking system which is operative in a push-pull mode to provide improved high-speed response and accuracy of angular positioning.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
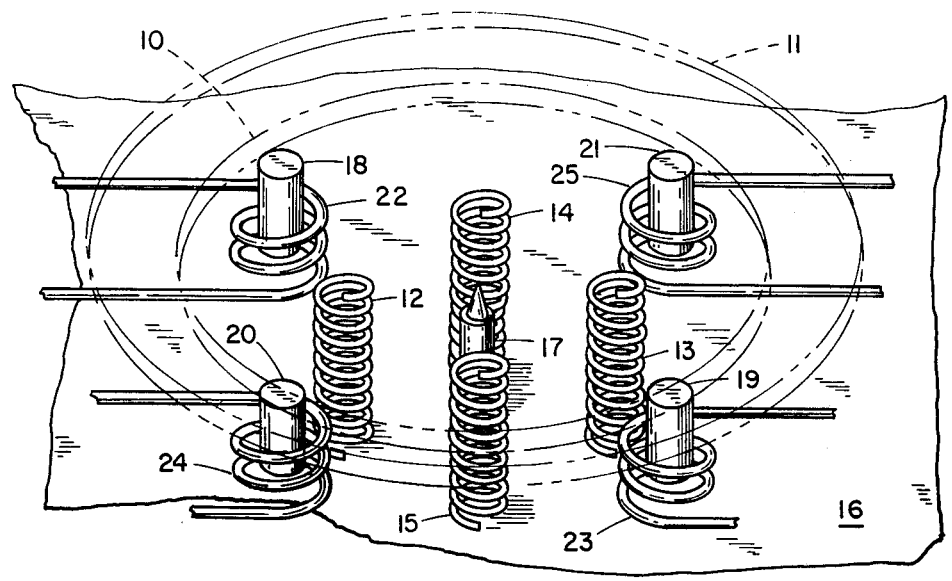
FIG. 1 is a perspective view of the preferred embodiment of the present invention.

As shown in the perspective illustration of FIG. 1 a baseplate 10 (illustrated in phantom for purposes of clarity and explanation) supports a reflective surface 11 which receives and reflects an optical beam such as a laser beam, for example, or light energy received from a distant target.

A first pair of resilient means 12 and 13 which may take the form of coil springs, such as illustrated in FIG. 1, are attached to support the baseplate at opposite points on a first support axis, preferably equidistant from the geometric center of the baseplate. A second pair of resilient means 13 and 14 which may also take the form of coil springs, as illustrated in FIG. 1, are attached to and support the baseplate 10 at opposite points also equidistant from its geometric center, thereby defining a second support axis at right angles to the first support axis determined by the first pair of resilient means 12 and 13.

Both pairs of resilient means 12, 13, and 14, 15 are, in turn, supported on a fixed structural base 16 so that only one end of each of the resilient means 12 and 13 and 14 and 15 is movable relative to the fixed support structure 16.

The pivotal support 17 is positioned at the geometric center of the baseplate 10 which point also is, of course, the intersection of the first and second axes of movement.

A first pair of permanent magnets 18 and 19 are affixed to the baseplate and extend therefrom at opposite points equidistant from the pivotal support thereby defining a first axis of movement. A second pair of permanent magnets 20 and 21 are affixed to the baseplate 10 and extend therefrom at opposite points equidistant from the pivotal support 17 defining a second axis of movement at right angles to the first axis of movement.

Each of the permanent magnets 18, 19, 20 and 21 have an electrically conductive coil disposed thereabout and spaced therefrom as illustrated at 22, 23, 24, and 25. When the coils 22 and 23 are energized by the conduction of electrical current therethrough due to the application of an appropriate control signal, electromotive force is generated by reason of the magnetic flux linkage between the permanent magnets 18 and 19 and the coils 22 and 23, thereby causing the baseplate 10 and the reflective surface 11 which it supports to be angularly changed about the pivotal support 17 in response to and commensurate with the applied control signal.

In an analogous manner the energization of conductive coils 24 and 25 causes electric current flow therethrough and electromotive force is developed by reason of the magnetic flux linkage between the permanent magnets 20 and 21 and the coils causing angular change about a second axis of movement in response to the applied signal.

Accordingly, by impressing selectively variable suitable electrical signals to the conductive coils 22, 23, 24 and 25, the angular disposition of baseplate 10 and the reflective surface 11 may be controlled about first and second axes of movement to provide virtually immediate response with a high degree of accuracy of the order of fractions of a microradian angular disposition.

Figure 2:
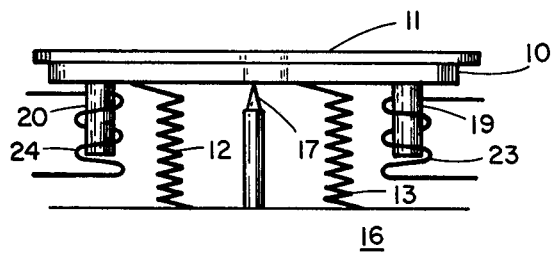
FIG. 2 is an end view of the embodiment of FIG. 1.

FIG. 2 is an end view of the embodiment of FIG. 1, clearly illustrating the manner in which the baseplate 10 and reflective surface 11 are mounted on the support structure 16 relative to the coil springs 12, 13 and 14, 15, as well as the conductive coils 22, 23, 24, 25 and their respectively associated permanent magnets 18, 19, 20, and 21.

Figure 3:
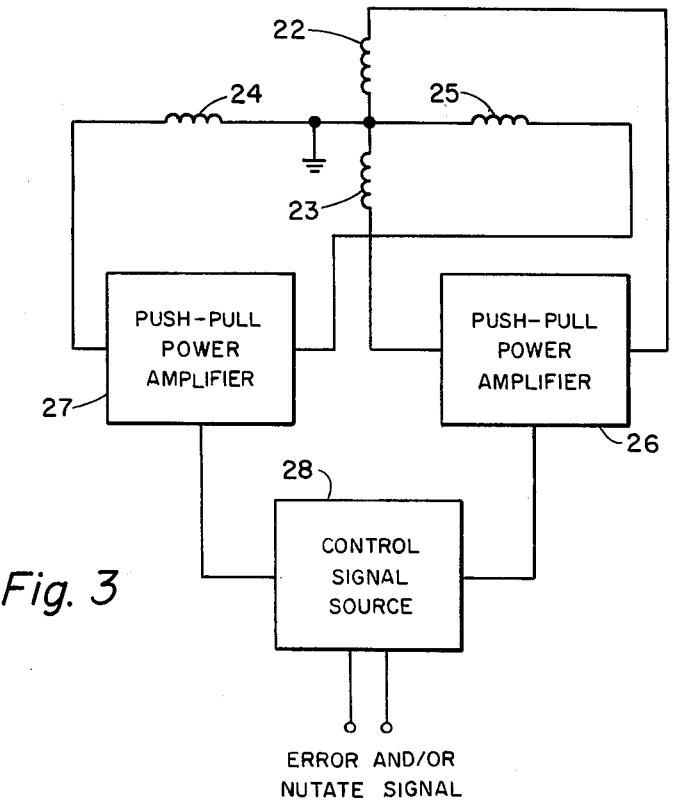
FIG. 3 is a schematic wiring diagram of the electrical portion of the present invention employed to control the angular disposition of the reflective surface in response to the applied signals.

FIG. 3 is a schematic block diagram illustrating the electronic control portions of a preferred embodiment of the present invention. In the illustration of FIG. 3 coils 22 and 23 are connected to a common ground and also a push-pull amplifier 26.

In a similar manner, coils 24 and 25 are disposed orthogonally relative to coils 22 and 23, connected to a common ground, and also connected to a second push-pull power amplifier 27. The push-pull power amplifiers 26 and 27 receive inputs from a control signal source 28 which may either be manually operative or produce its output signals in response to an error signal derived from the detected deviation of the instantaneous angular disposition of the reflective surface 11 of FIG. 1, relative to a desired angular disposition. Such deviation signal may be provided, for example, by the error signal derived in an associated servomechanism loop.

In some light energy tracking systems a type of detector is used which requires that the detected light energy be continuously nutated; in such systems the present invention offers an added advantage since the continuous nutation signal can be combined with the angular error signal in the control signal source 28 to drive the reflective surface in constant nutation.

It should be noted that the push-pull amplifiers supply output signals to the respective pairs of coils 22, 23, and 24, 25 so that opposite electromotive forces are developed by reason of the coils magnetic flux linkage with their respectively associated permanent magnets affixed to the baseplate 10 of FIG. 1. Thus, a very positive and extremely fast response for angularly repositioning the reflective surface 11 of FIG. 1 is provided in accordance with the concept of the present invention.

Moreover, as will readily be appreciated by those skilled and knowledgeable in the pertinent arts there is virtually no hysteresis associated with the electromagnetic type of actuation provided by the present invention and therefore no corrective signal is ordinarily required nor employed to return the baseplate 10 and reflective surface 11 of FIG. 1 to its initial angular disposition.

Furthermore, the type of electromagnetic control conceived and employed in the operation of the present invention provides a highly accurate control over angular disposition which is readily responsive to give effect to changes of as little as fractions of microradians as is often desired and required in modern day optical systems employing beam steering and/or light energy beam tracking.

Obviously many modifications and variations of the present invention are possible in the light of the above teachings. It is therefore to be understood that within the scope of the appended claims the invention may be practiced otherwise than as specifically described.

What is claimed is:

1. An optical beam steering system comprising:
   a base plate;
   a reflective surface supported on said base plate to receive and reflect an optical beam;
   a first pair of resilient means attached to support said base plate at opposite points on a first support axis, and equidistant from the geometric center of said base plate;
   a second pair of resilient means attached to support said base plate at opposite points equidistant from the geometric center of said base plate, defining a second support axis at right angles to said first support axis;
   a pivotal support positioned at said geometric center of said base plate;
   a first pair of permanent magnets extending from said base plate at opposite points equidistant from said pivotal support and defining a first axis of movement;
   a second pair of permanent magnets extending from said base plate at opposite points equidistant from said pivotal support and defining a second axis of movement at right angles to said first axis of movement;
   a plurality of electrically conductive coils, each disposed around one of said permanent magnets and spaced therefrom; and
   a selectively variable electrical signal source, connectable to said coils for generating electromotive forces transmitted to said base plate whereby to angularly position said base plate and reflective surface about said first and second axes of movement commensurate with the applied signals.

2. An optical beam steering system as claimed in claim 1 wherein said resilient means comprises coil springs.

3. An optical beam steering system as claimed in claim 1 wherein said first and second support axes are disposed at 45° relative to said first and second axes of movement.

4. An optical beam steering system as claimed in claim 1 wherein said pivotal support is a jewel bearing.

5. An optical beam steering system as claimed in claim 1 wherein said electrical signal source comprises electronic amplifier circuitry.

6. An optical beam steering system as claimed in claim 5 wherein said electronic amplifier circuitry comprises two push-pull power amplifiers, each having its output connected to a pair of oppositely disposed electrically conductive coils.

7. An optical beam steering system as claimed in claim 6 wherein the input signals to said push-pull amplifiers comprises error signals derived from a deviation of the instantaneous angular position of said reflective surface relative to a desired angular disposition.

* * * * *